US012641117B2

(12) United States Patent
   Kras

(10) Patent No.: US 12,641,117 B2
(45) Date of Patent: May 26, 2026

(54) SYSTEMS AND METHODS TO IDENTIFY A SIMULATED PHISHING MESSAGE

(71) Applicant: KnowBe4, Inc., Clearwater, FL (US)

(72) Inventor: Greg Kras, Dunedin, FL (US)

(73) Assignee: KnowBe4, Inc.

( * ) Notice: Subject to any disclaimer, the term of this patent is extended or adjusted under 35 U.S.C. 154(b) by 196 days.

(21) Appl. No.: 17/705,114

(22) Filed: Mar. 25, 2022

(65) Prior Publication Data

US 2022/0321601 A1      Oct. 6, 2022

Related U.S. Application Data

(60) Provisional application No. 63/168,575, filed on Mar. 31, 2021.

(51) Int. Cl.
   *H04L 9/40*       (2022.01)
   *H04L 9/32*       (2006.01)
   *H04L 51/21*      (2022.01)

(52) U.S. Cl.
   CPC ........ *H04L 63/1483* (2013.01); *H04L 9/3239* (2013.01); *H04L 51/21* (2022.05); *H04L 63/12* (2013.01)

(58) Field of Classification Search
   CPC ..... H04L 63/1483; H04L 63/14; H04L 51/42; H04L 63/12; H04L 51/21; H04L 9/3239; H04L 51/00; G06F 21/00; G06F 9/44526
   See application file for complete search history.

(56) References Cited

U.S. PATENT DOCUMENTS

| | | | |
|---|---|---|---|
| 8,103,875 B1 * | 1/2012 | Ramzan | H04L 63/0236 |
| | | | 713/180 |
| 8,615,807 B1 | 12/2013 | Higbee et al. | |
| 8,635,703 B1 | 1/2014 | Belani et al. | |

(Continued)

FOREIGN PATENT DOCUMENTS

| | | | |
|---|---|---|---|
| EP | 3 582 468 A1 | 12/2019 | |
| EP | 4040754 A1 * | 8/2022 | H04L 51/12 |

(Continued)

OTHER PUBLICATIONS

"Crocker, D. DomainKeys Identified Mail (DKIM) Signatures. Sep. 2011. Internet Engineering Task Force (IETF)." (Year: 2011).*

(Continued)

*Primary Examiner* — Hadi S Armouche
(74) *Attorney, Agent, or Firm* — Foley & Lardner LLP

(57) ABSTRACT

Systems and methods are described for detecting a simulated phishing message by an email client plug-in. A unique key is received at the email client plug-in. An indication that an email was reported by a user as a suspicious message is received at the email client plug-in. The email is a simulated phishing message having the unique key mapped by cryptographic hashing function into a hash value in a predetermined field in the header of the simulated phishing message. The presence of the predetermined field is detected and the hash value in the predetermined field is compared to a result of applying cryptographic hashing function to the unique key received by the email client plug-in. Responsive to being matched to the result, it is determined that the suspicious message is a simulated phishing message generated by a server.

16 Claims, 8 Drawing Sheets

(56) References Cited

U.S. PATENT DOCUMENTS

| | | | |
|---|---|---|---|
| 8,719,940 | B1 | 5/2014 | Higbee et al. |
| 8,910,281 | B1* | 12/2014 | Aharoni ............. H04L 63/1416 |
| | | | 726/22 |
| 8,910,287 | B1 | 12/2014 | Belani et al. |
| 8,966,637 | B2 | 2/2015 | Belani et al. |
| 9,053,326 | B2 | 6/2015 | Higbee et al. |
| 9,246,936 | B1 | 1/2016 | Belani et al. |
| 9,253,207 | B2 | 2/2016 | Higbee et al. |
| 9,262,629 | B2 | 2/2016 | Belani et al. |
| 9,325,730 | B2 | 4/2016 | Higbee et al. |
| 9,356,948 | B2 | 5/2016 | Higbee et al. |
| 9,398,038 | B2 | 7/2016 | Higbee et al. |
| 9,591,017 | B1 | 3/2017 | Higbee et al. |
| 9,667,645 | B1 | 5/2017 | Belani et al. |
| 9,774,262 | B2* | 9/2017 | Ohtake ............. H02M 3/33571 |
| 9,774,626 | B1* | 9/2017 | Himler ................ H04L 63/1483 |
| 9,781,149 | B1* | 10/2017 | Himler ................ H04L 63/1425 |
| 9,800,613 | B1* | 10/2017 | Irimie ...................... H04L 51/42 |
| 9,912,687 | B1 | 3/2018 | Wescoe et al. |
| 10,819,744 | B1* | 10/2020 | Higbee .............. H04L 63/1433 |
| 10,904,186 | B1 | 1/2021 | Everton et al. |
| 10,970,188 | B1* | 4/2021 | Åvist .................. H04L 63/1441 |
| 10,986,122 | B2 | 4/2021 | Bloxham et al. |
| 11,044,267 | B2 | 6/2021 | Jakobsson et al. |
| 11,102,244 | B1* | 8/2021 | Jakobsson ............... H04L 51/42 |
| 11,165,792 | B2* | 11/2021 | Dedenok .............. H04L 51/212 |
| 11,184,393 | B1 | 11/2021 | Gendre et al. |
| 11,269,994 | B2* | 3/2022 | Kras ................... H04L 63/1483 |
| 11,297,094 | B2 | 4/2022 | Huda |
| 11,381,541 | B2* | 7/2022 | Kras ....................... H04L 67/02 |
| 11,500,984 | B2* | 11/2022 | Kras .................. H04L 63/0227 |
| 11,757,914 | B1* | 9/2023 | Jakobsson ............... H04L 51/42 |
| | | | 726/25 |
| 2006/0101124 | A1* | 5/2006 | Landis ................. G06Q 10/107 |
| | | | 709/206 |
| 2007/0094500 | A1* | 4/2007 | Shannon ............... G06F 21/645 |
| | | | 713/170 |
| 2007/0294352 | A1* | 12/2007 | Shraim ............. H04L 63/1483 |
| | | | 709/206 |
| 2012/0204032 | A1* | 8/2012 | Wilkins ................... H04L 9/321 |
| | | | 713/170 |
| 2014/0230060 | A1* | 8/2014 | Higbee .............. H04L 63/1483 |
| | | | 726/24 |
| 2014/0230065 | A1* | 8/2014 | Belani ...................... G06F 21/00 |
| | | | 726/25 |
| 2016/0164898 | A1 | 6/2016 | Belani et al. |
| 2016/0301705 | A1* | 10/2016 | Higbee ................... H04L 51/42 |
| 2018/0324201 | A1* | 11/2018 | Lowry ................ H04L 63/1425 |
| 2019/0173819 | A1* | 6/2019 | Wescoe ................. G06F 21/566 |
| 2019/0245885 | A1 | 8/2019 | Starink et al. |
| 2019/0319905 | A1* | 10/2019 | Baggett ................. H04L 51/212 |
| 2020/0137081 | A1* | 4/2020 | Goldstein ............. H04L 63/083 |
| 2020/0184100 | A1* | 6/2020 | Ong ..................... G06F 16/1824 |
| 2020/0213332 | A1* | 7/2020 | Thirumavalavan ... H04L 63/126 |
| 2020/0311260 | A1 | 10/2020 | Klonowski et al. |
| 2020/0314120 | A1* | 10/2020 | Dedenok ................ H04L 51/18 |
| 2020/0366712 | A1* | 11/2020 | Onut ................... H04L 63/1416 |
| 2020/0366713 | A1* | 11/2020 | Rodriguez ......... H04L 63/1483 |
| 2021/0021612 | A1* | 1/2021 | Higbee .............. H04L 63/1416 |
| 2021/0185075 | A1 | 6/2021 | Adams |
| 2021/0194924 | A1 | 6/2021 | Heinemeyer et al. |
| 2021/0407308 | A1 | 12/2021 | Brubaker et al. |
| 2022/0005373 | A1 | 1/2022 | Nelson et al. |
| 2022/0006830 | A1 | 1/2022 | Wescoe |
| 2022/0078207 | A1 | 3/2022 | Chang et al. |
| 2022/0094702 | A1 | 3/2022 | Saad Ahmed et al. |
| 2022/0100332 | A1 | 3/2022 | Haworth et al. |
| 2022/0116419 | A1 | 4/2022 | Kelm et al. |
| 2022/0130274 | A1 | 4/2022 | Krishna Raju et al. |
| 2022/0286419 | A1 | 9/2022 | Stetzer et al. |
| 2022/0321518 | A1* | 10/2022 | Khan ..................... H04L 63/126 |

FOREIGN PATENT DOCUMENTS

| | | | | | |
|---|---|---|---|---|---|
| JP | 2002082888 | A | * | 3/2002 | ......... H04L 12/2803 |
| JP | 2005135024 | A | * | 5/2005 | |
| JP | 2007004373 | A | * | 1/2007 | |
| WO | WO-2016/164844 | A1 | | 10/2016 | |

OTHER PUBLICATIONS

Adamov, A. "Internet technologies in depth, the technique of spam recognition based on header investigating". 2011 5th International Conference on Application of Information and Communication Technologies (AICT), Baku, Azerbaijan, 2011, pp. 1-4. 2011. (Year: 2011).*

Crocker et al., "RFC 6376—DomainKeys Indentified Mail (DKIM) Signatures", Internet Engineering Task Force (IETF), Sep. 1, 2011, XP055123471, Retrieved from the Internet: URL:http://tools.ietf.org/html/rfc6376 [retrieved on Jun. 16, 2014], pp. 1-52 (104 total pages).

International Search Report and Written Opinion on PCT Appl. Ser. No. PCT/US2022/022021 dated Jun. 23, 2022 (29 pages).

International Preliminary Report on Patentability and Written Opinion on PCT Appl. Ser. No. PCT/US2022/022021 dated Oct. 3, 2023 (9 pages).

International Preliminary Report on PCT Appln No. PCT/US2022/022021 dated Oct. 12, 2023.

* cited by examiner

200

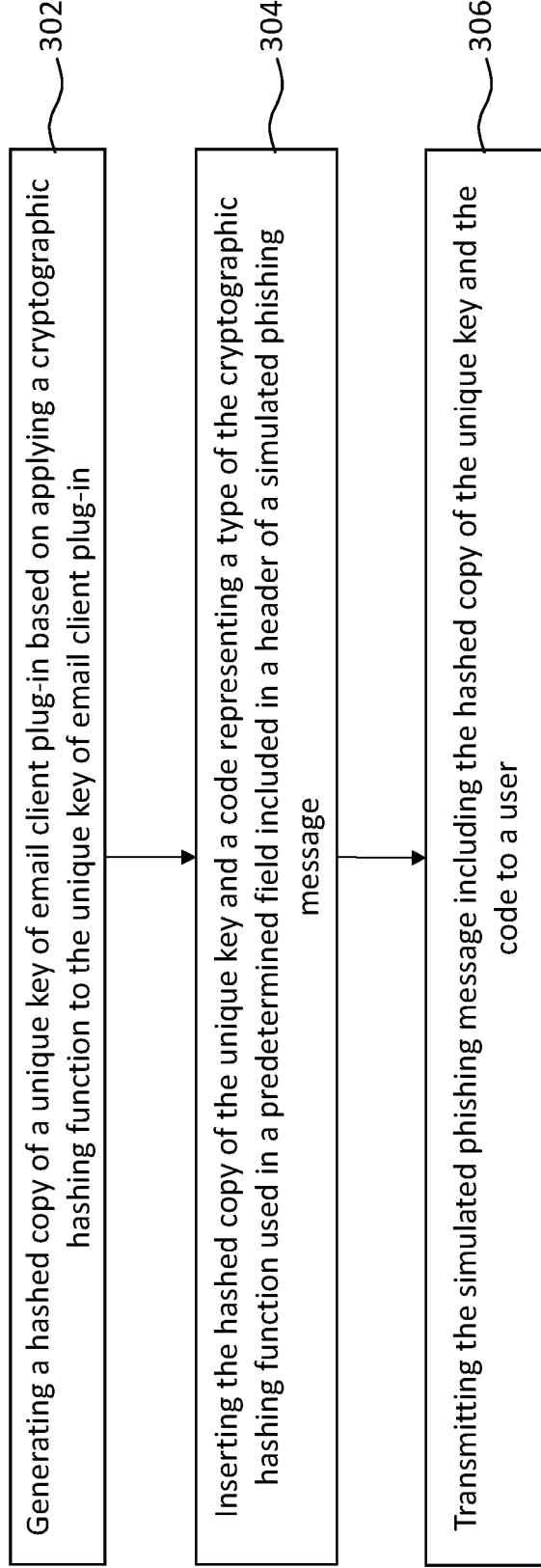

300

302

Generating a hashed copy of a unique key of email client plug-in based on applying a cryptographic hashing function to the unique key of email client plug-in

304

Inserting the hashed copy of the unique key and a code representing a type of the cryptographic hashing function used in a predetermined field included in a header of a simulated phishing message

306

Transmitting the simulated phishing message including the hashed copy of the unique key and the code to a user

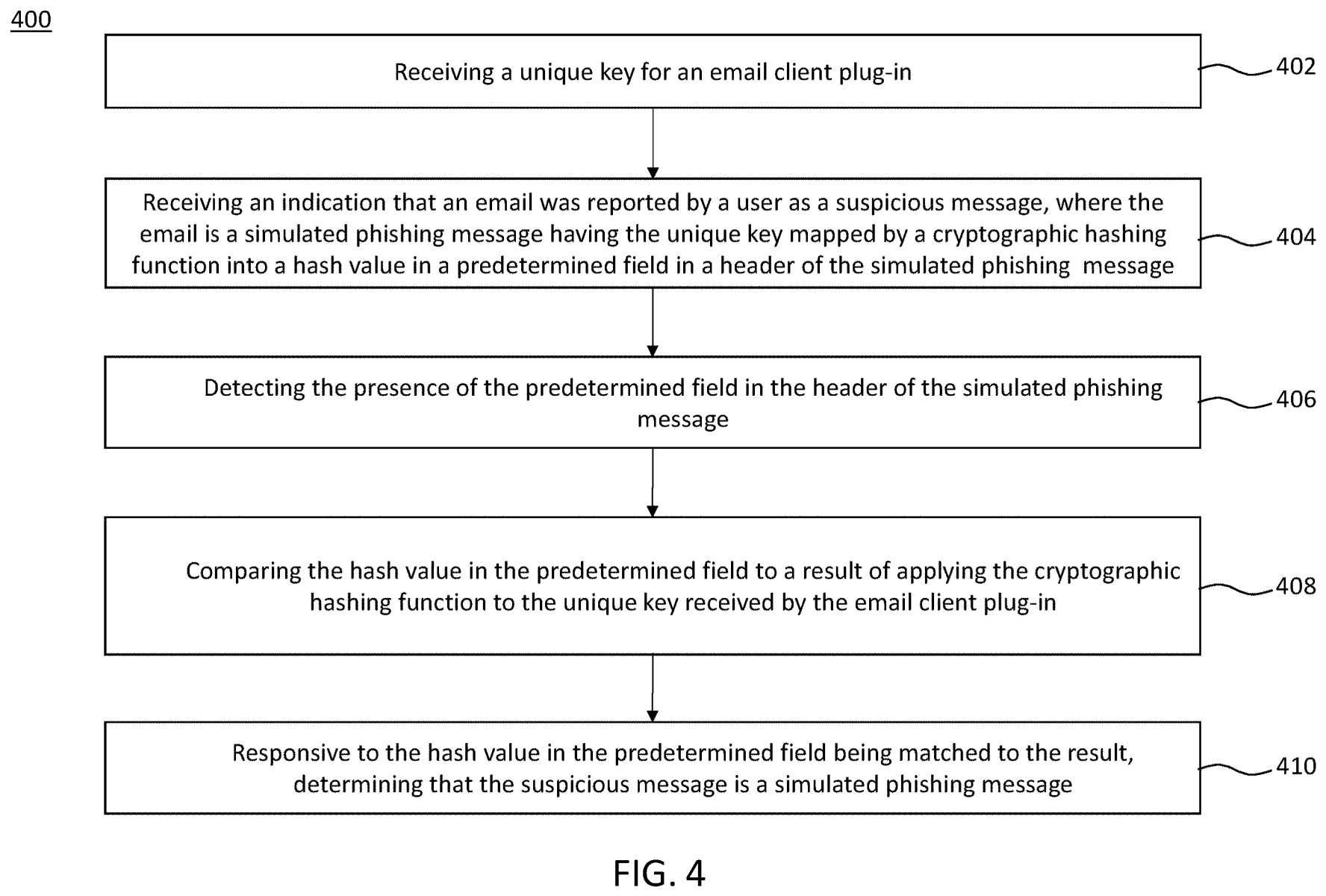

Receiving a unique key for an email client plug-in

404

Receiving an indication that an email was reported by a user as a suspicious message, where the email is a simulated phishing message having the unique key mapped by a cryptographic hashing function into a hash value in a predetermined field in a header of the simulated phishing message

406

Detecting the presence of the predetermined field in the header of the simulated phishing message

408

Comparing the hash value in the predetermined field to a result of applying the cryptographic hashing function to the unique key received by the email client plug-in

410

Responsive to the hash value in the predetermined field being matched to the result, determining that the suspicious message is a simulated phishing message

FIG. 4

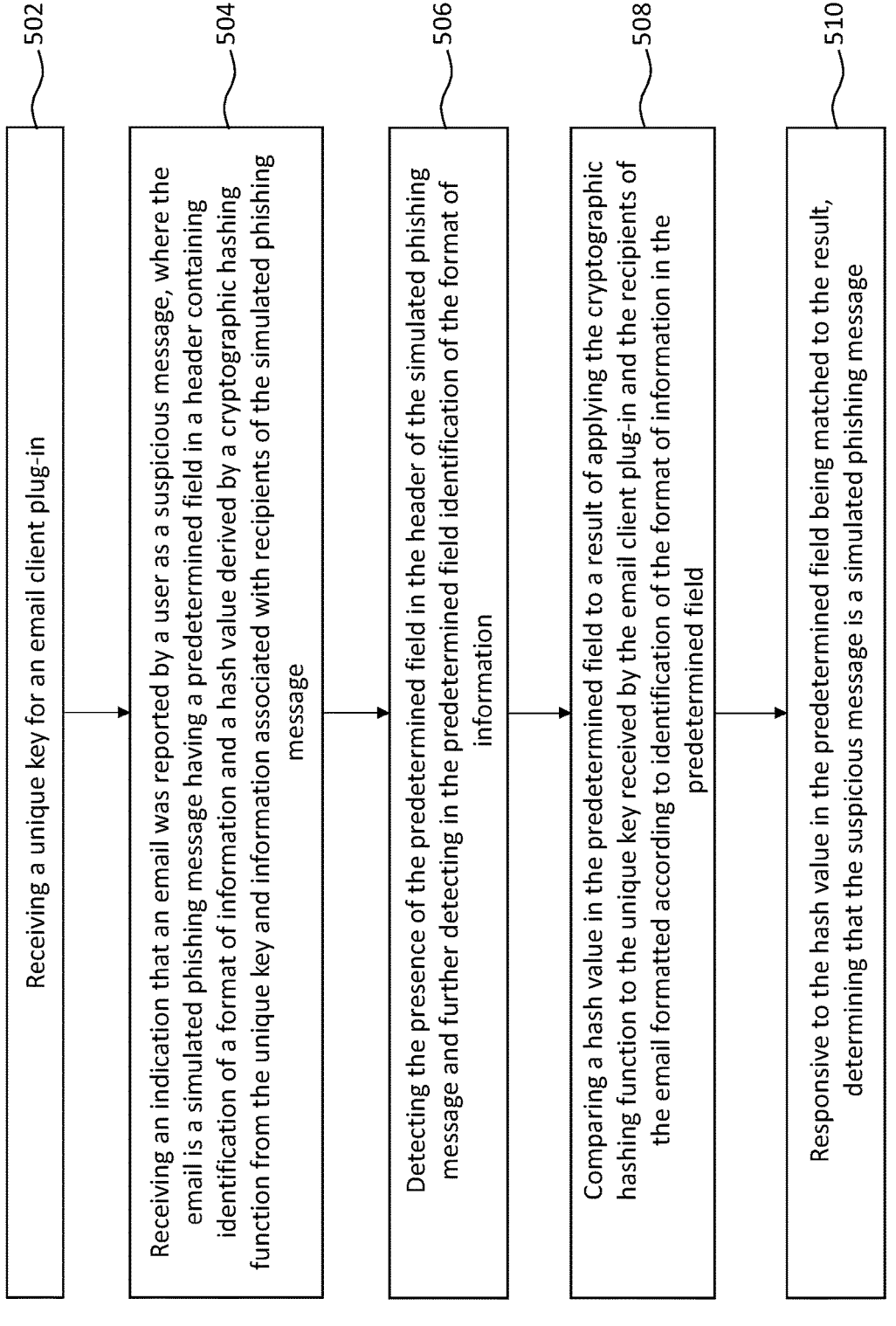

500

502 — Receiving a unique key for an email client plug-in

504 — Receiving an indication that an email was reported by a user as a suspicious message, where the email is a simulated phishing message having a predetermined field in a header containing identification of a format of information and a hash value derived by a cryptographic hashing function from the unique key and information associated with recipients of the simulated phishing message 506 — Detecting the presence of the predetermined field in the header of the simulated phishing message and further detecting in the predetermined field identification of the format of information 508 — Comparing a hash value in the predetermined field to a result of applying the cryptographic hashing function to the unique key received by the email client plug-in and the recipients of the email formatted according to identification of the format of information in the predetermined field 510 — Responsive to the hash value in the predetermined field being matched to the result, determining that the suspicious message is a simulated phishing message

FIG. 5

SYSTEMS AND METHODS TO IDENTIFY A SIMULATED PHISHING MESSAGE

CROSS-REFERENCE TO RELATED APPLICATION

This patent application claims priority to and the benefit of U.S. Patent Application No. 63/168,575 titled "SYSTEMS AND METHODS TO IDENTIFY A SIMULATED PHISHING MESSAGE," and filed on Mar. 31, 2021, the contents of all of which are hereby incorporated herein by reference in its entirety for all purposes.

TECHNICAL FIELD

The present disclosure relates to systems and methods for identifying a simulated phishing message. In particular, the present disclosure relates to identification of a simulated phishing message by an email client plug-in.

BACKGROUND

Among cybersecurity attacks, organizations have recognized phishing attacks as one of the most prominent threats that can cause serious breaches of data including confidential information such as intellectual property, financial information, an organization's information, and other important information. Attackers who launch phishing attacks may attempt to evade an organization's security apparatuses and tools and target its employees. To prevent or to reduce the success rate of phishing attacks on employees, the employees of the organization may be provided with various reporting tools to support the employees to report suspicious messages (potentially malicious phishing messages). One such tool is an email client plug-in that may be added to or provided with an email client to report suspicious messages. The email client plug-in may be provided by the same entity that provides the email client software or may be provided by a different entity. In an example, the email client plug-in is an interface local to the email client that enables email client users, i.e., recipients of messages, to select to report suspicious messages that they believe may be a threat to them or their organization. In an example, the email client may include an email client plug-in that provides a User Interface (UI) element such as a button to trigger a function. A functionality of an email client plug-in that uses a UI button may be triggered when an employee clicks the button. An example of an email client plug-in that uses a button UI for reporting suspicious messages includes a Phish Alert Button (PAB) plug-in.

In some examples, in response to receiving an indication that an employee selected to report a suspicious message, the email client plug-in may cause the email client to forward the reported suspicious message (or a copy of the reported suspicious message) to a threat reporting platform for evaluation. Further, in some examples, the email client plug-in may notify a security awareness and training platform implemented by the organization, and the security awareness and training platform may retrieve the reported suspicious message and send it to the threat reporting platform. In some examples, the employee may forward the suspicious message to a system administrator or a security authority including an Information Technology (IT) department, a security team, a manager of the employee, an Incident Response (IR) team, and so on. In such examples, a record of the original recipient (i.e., the employee who received the suspicious message) may be recorded and the suspicious message may be sent to the threat reporting platform.

SUMMARY

The present disclosure generally relates to systems and methods for identifying a simulated phishing message. In particular, the present disclosure relates to identification of a simulated phishing message by an email client plug-in.

Systems and methods are provided for detecting a simulated phishing message by an email client plug-in. In an example embodiment, a method for detecting a simulated phishing message by an email client plug-in is described, which includes receiving, by an email client plug-in on a client device, a unique key for the email client plug-in from a server, receiving, by the email client plug-in, an indication that an email was reported by a user as a suspicious message, the email communicated by the server as a simulated phishing message having the unique key of that email client plug-in mapped by a cryptographic hashing function into a hash value in a predetermined field in a header of the simulated phishing message, detecting, by the email client plug-in, presence of the predetermined field in the header of the simulated phishing message, comparing, by the email client plug-in, the hash value in the predetermined field to a result of applying by the email client plug-in the cryptographic hashing function to the unique key received by the email client plug-in, and determining, by the email client plug-in responsive to the hash value in the predetermined field being matched to the result of applying the cryptographic hashing function to the unique key, that the suspicious message is a simulated phishing message generated by the server.

In some embodiments, the method further includes receiving, by the email client plug-in, the unique key upon initialization of the email client plug-in, wherein the unique key is unique to the email client plug-in among a plurality of email client plug-ins.

In some implementations, the method further includes receiving, by the email client plug-in, from the server one or more of the following: a list of one or more cryptographic hashing functions for encoding the hash value, identification of the predetermined field, and identification of information to be mapped into the hash value.

In some implementations, the predetermined field in the header of the simulated phishing message comprises identification of a type of the cryptographic hashing function used by the server to encrypt the hash value in the predetermined field.

In some implementations, the method further includes identifying, by the email client plug-in, the type of cryptographic hashing function used by the server in the predetermined field and applying the type of cryptographic hashing function to the unique key received by the email client plug-in.

In some implementations, the predetermined field in the header of the simulated phishing message comprises identification of a format of information for the email client plug-in to which to apply the cryptographic hashing function by the email client plug-in.

In some implementations, the method further includes identifying, by the email client plug-in, the format of the information identified by the predetermined field and applying the cryptographic hashing function to the unique key received by the email client plug-in and the information in accordance with the format.

In some implementations, the information comprises a list of one or more intended recipients of the simulated phishing message.

In some implementations, the format comprises a comma separated list of values.

In some implementations, the format comprises an order of values to identify the order of the unique key of the email client plug-in and the information.

In another example implementation, a system for detecting a simulated phishing message by an email client plug-in is described, which includes an email client plug-in configured on a client device. The email client plug-in is configured to receive a unique key for the email client plug-in from a server, receive an indication that an email was reported by a user as a suspicious message, the email communicated by the server as a simulated phishing message having the unique key of that email client plug-in mapped by a cryptographic hashing function into a hash value in a predetermined field in a header of the simulated phishing message, detect presence of the predetermined field in the header of the simulated phishing message, compare the hash value in the predetermined field to a result of applying by the email client plug-in the cryptographic hashing function to the unique key received by the email client plug-in, and determine, responsive to the hash value in the predetermined field being matched to the result, that the suspicious message is a simulated phishing message generated by the server.

Other aspects and advantages of the disclosure will become apparent from the following detailed description, taken in conjunction with the accompanying drawings, which illustrate by way of example the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts a flowchart for communicating a simulated phishing message having a unique key of the email client plug-in to a user;

FIG. 4 depicts a flowchart for detecting a simulated phishing message by the email client plug-in, according to some embodiments; and FIG. 5 depicts a flowchart for determining that a message is a simulated phishing message by the email client plug-in, according to some embodiments.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for identifying a simulated phishing message. In particular, Section B describes identification of a simulated phishing message by an email client plug-in.

A. Computing and Network Environment

Figure 1A:
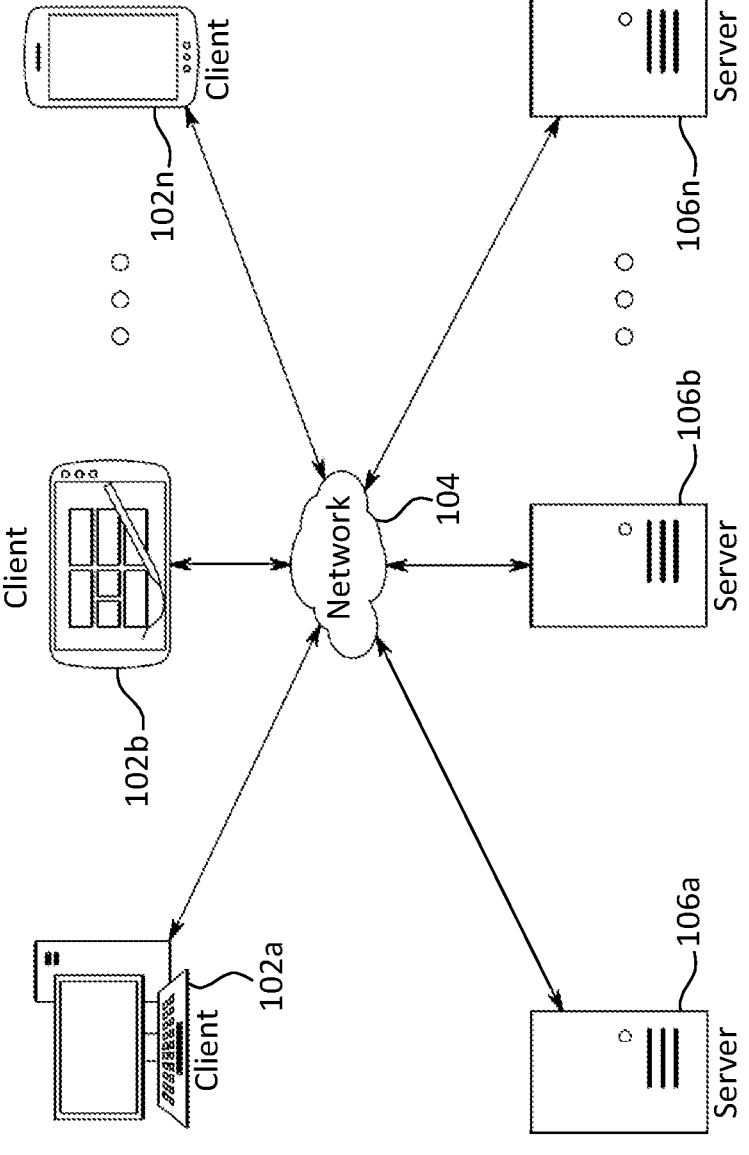
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-

5

Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g., Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
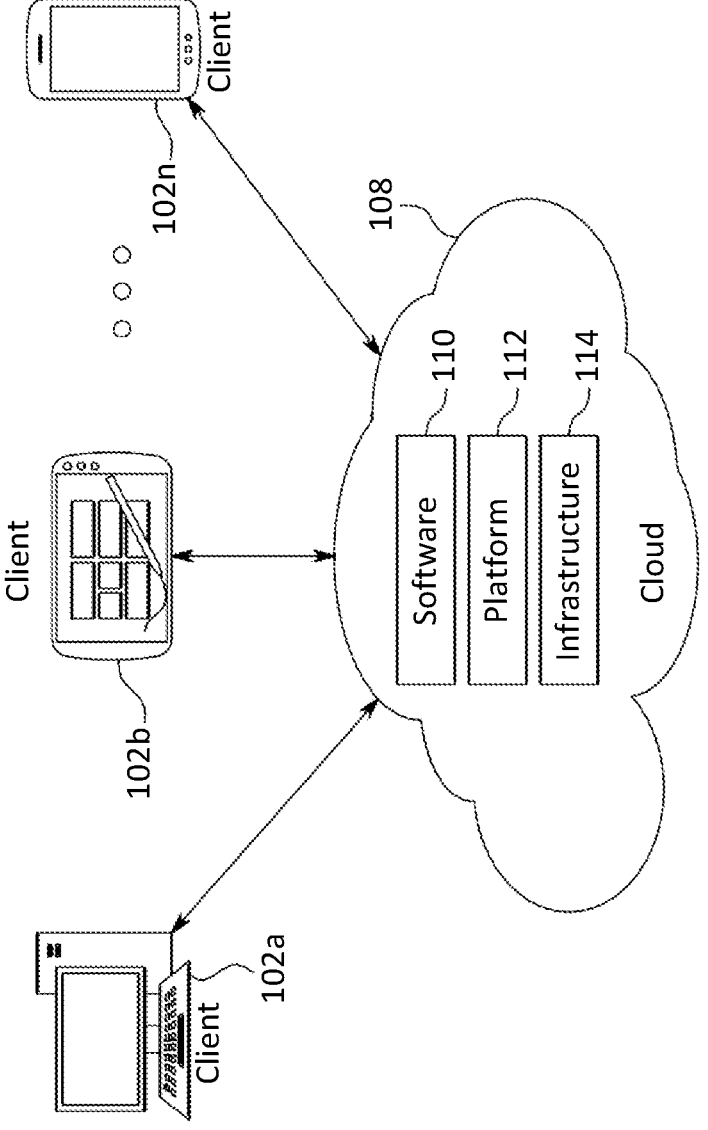
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, virtualization, or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g., Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
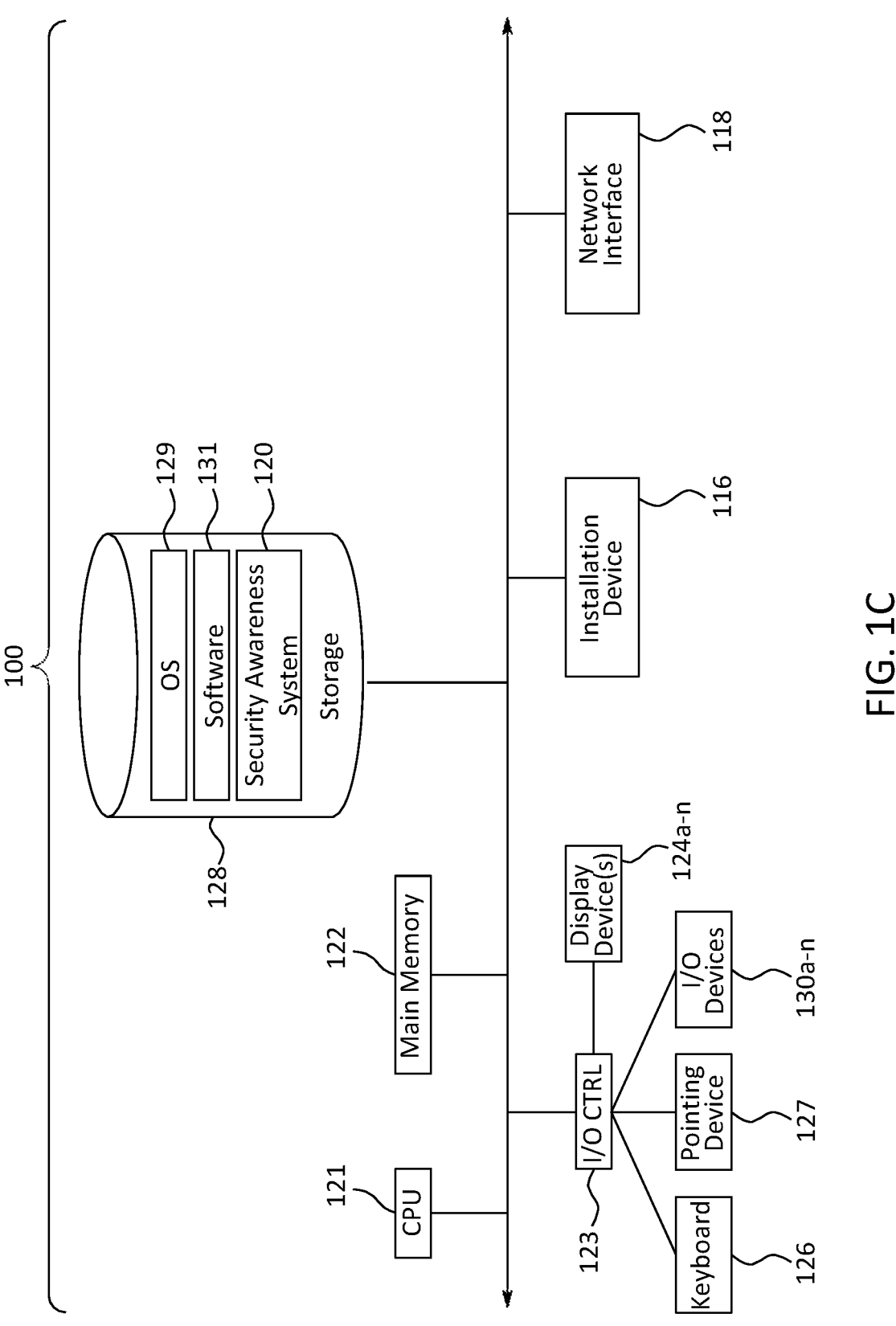
FIGS. 1C and 1D are block diagrams depicting embodiments of computing devices useful in connection with the methods and systems described herein, according to some embodiments.
Figure 1D:
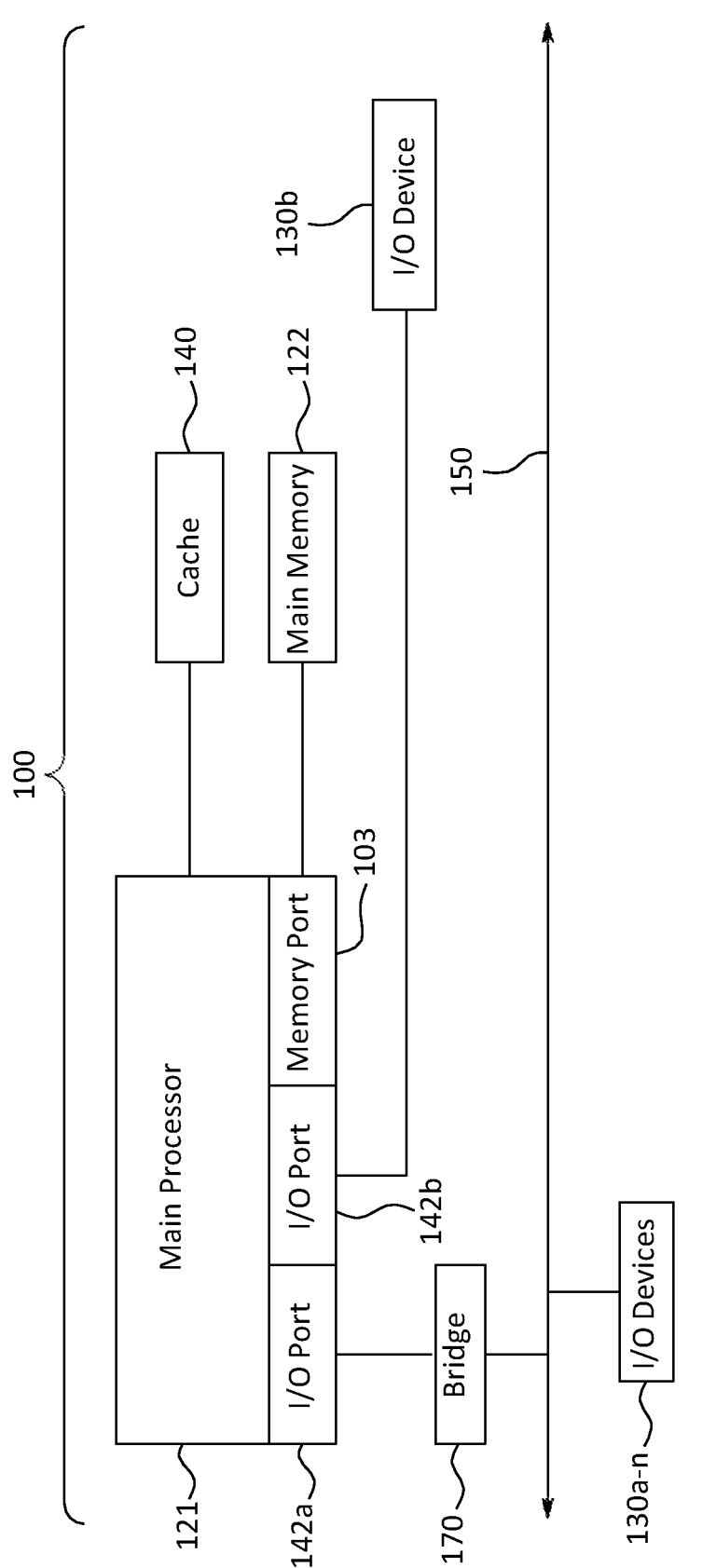

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHE-NOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPI-DIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect, or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g., one or more hard disk drives or redundant arrays of independent disks) for storing an operating system or other related software, and for storing application software programs such as any program related to security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, Tl, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g., the IPAD line of devices by Apple; GALAXY TAB family of devices by Samsung; or KINDLE FIRE, by Amazon.com, Inc. of Seattle, Washington. In other embodiments, computing device 100 is an eBook reader, e.g., the KINDLE family of devices by Amazon.com, or NOOK family of devices by Barnes & Noble, Inc. of New York City, New York.

In some embodiments, communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g., a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods to Identify a Simulated Phishing Message

The following describes systems and methods for identification of a simulated phishing message by an email client plug-in.

The systems and methods of the present disclosure enable creation of new or enhanced extended header (X-header) fields which may be included in simulated phishing messages to allow an email client plug-in to identify the simulated phishing messages independently of (i.e., without interaction with) any other system (for example, a threat detection platform). In an example implementation, the email client plug-in may be enabled to determine that a simulated phishing message has been generated by a security awareness and training platform implemented by an organization. As a result, the X-header fields are not sent for processing over a network connection that may not be secure. Also, since the X-header is carried as plain text within an email header, the systems and methods enable hashing or encryption of data included in the X-header to protect the data from analysis, modification, and spoofing.

Figure 2:
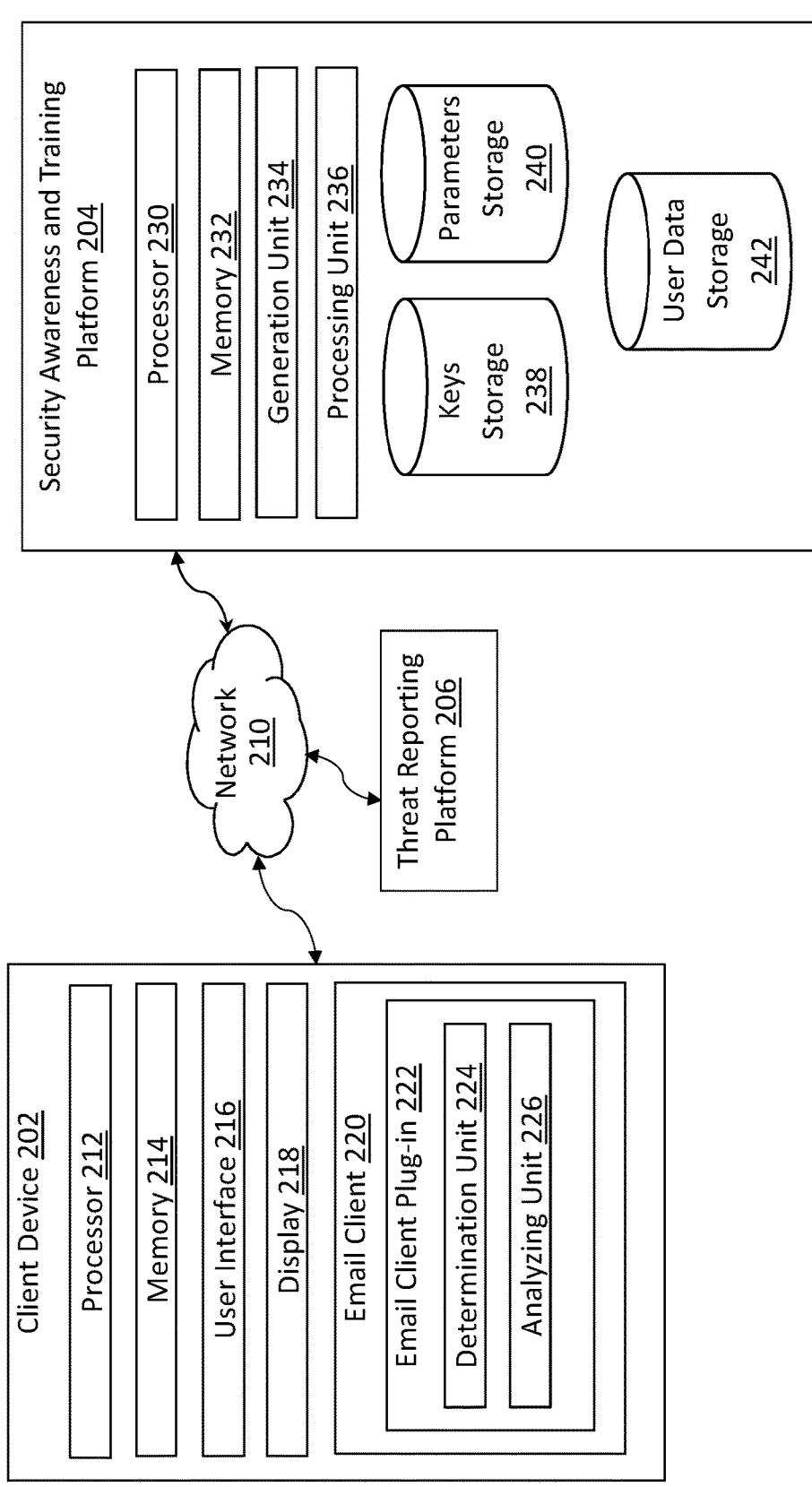
FIG. 2 depicts an implementation of some of an architecture of a system for identification of a simulated phishing message by an email client plug-in, according to some embodiments.

FIG. 2 depicts an implementation of some of an architecture of system 200 for identification of a simulated phishing message by an email client plug-in, according to some embodiments.

System 200 may include client device 202, security awareness and training platform 204, threat reporting platform 206, and network 210 enabling communication between the system components for information exchange. Network 210 may be an example or instance of network 104, details of which are provided with reference to FIG. 1A and its accompanying description. In an example, network 210 may be a secure network. According to aspects of the present disclosure, system 200 may be owned or managed or otherwise associated with an organization or any entity authorized thereof. In an implementation, system 200 may manage cybersecurity awareness for the organization.

According to an implementation, client device 202 may be any computing device used by a user. In some embodiments, the user may be an employee of the organization, a customer, or a vendor, or anyone associated with the organization. In some embodiments, the user may be an end-customer/consumer or a patron using the goods and/or services of the organization. Client device 202, as disclosed, may be any computing device, such as a desktop computer, a laptop, a tablet computer, a mobile device, a Personal Digital Assistant (PDA) or any other computing device. In an implementation, client device 202 may be a device, such as client device 102 shown in FIG. 1A and FIG. 1B. Client device 202 may be implemented by a device, such as computing device 100 shown in FIG. 1C and FIG. 1D.

According to some embodiments, client device 202 may include processor 212 and memory 214. In an example, processor 212 and memory 214 of client device 202 may be CPU 121 and main memory 122, respectively, as shown in FIGS. 1C and 1D. Client device 202 may also include user interface 216, such as a keyboard, a mouse, a touch screen, a haptic sensor, voice-based input unit, or any other appropriate user interface. It shall be appreciated that such components of client device 202 may correspond to similar components of computing device 100 in FIGS. 1C and 1D, such as keyboard 126, pointing device 127, I/O devices 130*a-n* and display devices 124*a-n*. Client device 202 may also include display 218, such as a screen, a monitor connected to the device in any manner, or any other appropriate display. In an implementation, client device 202 may display received content (for example, emails) for the user using display 218 and is able to accept user interaction via user interface 216 responsive to the displayed content.

In some embodiments, client device 202 may include email client 220. In one example implementation, email client 220 may be an application installed on client device 202. In another example implementation, email client 220 may be an application that can be accessed over network 210 through a browser without requiring installation on client device 202. In an implementation, email client 220 may be any application capable of composing, sending, receiving, and reading emails. For example, email client 220 may be an instance of an application, such as Microsoft Outlook™ application, IBM® Lotus Notes® application, Apple® Mail application, Gmail® application, or any other known or custom email application. In an example, the user of client device 202 may be mandated to download and install email client 220 by the organization. In another example, email client 220 may be provided by the organization as default. In some examples, the user of client device 202 may select, purchase and/or download email client 220, through for example, an application distribution platform. The term "application" as used herein may refer to one or more applications, services, routines, or other executable logic or instructions.

In one or more embodiments, email client 220 may include email client plug-in 222. An email client plug-in may be an application or a program that may be included in an email client for providing one or more additional features or for enabling customization to existing features. For example, email client plug-in 222 may be used by the user to report suspicious emails. In an example, email client plug-in may include a User Interface (UI) element such as a button to trigger a function. Functionality of client-side plug-ins that use a UI button may be triggered when a user clicks the button. Some examples of client-side plug-ins that use a UI button include, but are not limited to, a Phish Alert Button (PAB) plug-in, a Report Message add-in, a task create plug-in, a spam marking plug-in, an instant message plug-in, a social media reporting plug-in and a search and highlight plug-in. In an embodiment, email client plug-in 222 may be a PAB plug-in. In some embodiments, email client plug-in 222 may be a Report Message add-in. In an example, email client plug-in 222 may be implemented in an email menu bar of email client 220. In another example, email client plug-in 222 may be implemented in a ribbon area of email client 220. In another example, email client plug-in 222 may be implemented in any area of email client 220.

In some implementations, email client plug-in 222 may not be implemented in email client 220 but may coordinate and communicate with email client 220. In some implementations, email client plug-in 222 is an interface local to email client 220 that supports email client users. In one or more embodiments, email client plug-in 222 may be an application that supports the user, i.e., recipient of messages, to report suspicious phishing messages the user believes may be a threat to them or their organization. Other implementations of email client plug-in 222 not discussed here are contemplated herein. Although it has been described that client device 202 includes a single email client (i.e., email client 220) and a single email client plug-in (i.e., email client plug-in 222), in some embodiments, client device 202 may include more than one email client and email client plug-in.

Referring back to FIG. 2, email client plug-in 222 may include determination unit 224 and analyzing unit 226. In an implementation, determination unit 224 and analyzing unit 226 may be communicatively coupled to processor 212 and memory 214. In some embodiments, determination unit 224 and analyzing unit 226 amongst other units, may include routines, programs, objects, components, data structures, etc., which may perform particular tasks or implement particular abstract data types. Determination unit 224 and analyzing unit 226 may also be implemented as, signal processor(s), state machine(s), logic circuitries, and/or any other device or component that manipulate signals based on operational instructions.

In some embodiments, determination unit 224 and analyzing unit 226 may be implemented in hardware, instructions executed by a processing module, or by a combination thereof. The processing module may comprise a computer, a processor, a state machine, a logic array, or any other suitable devices capable of processing instructions. The processing module may be a general-purpose processor which executes instructions to cause the general-purpose processor to perform the required tasks or the processing module may be dedicated to perform the required functions. In some embodiments, determination unit 224 and analyzing unit 226 may be machine-readable instructions which, when executed by a processor/processing module, perform intended functionalities of determination unit 224 and analyzing unit 226. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, machine-readable instructions may be stored in memory 214.

According to some embodiments, security awareness and training platform 204 may be implemented in a variety of computing systems, such as a mainframe computer, a server, a network server, a laptop computer, a desktop computer, a notebook, a workstation, and any other computing system. In an implementation, security awareness and training platform 204 may be implemented in a server, such as server 106 shown in FIG. 1A. In some implementations, security awareness and training platform 204 may be implemented by a device, such as computing device 100 shown in FIGS. 1C and 1D. In some embodiments, security awareness and training platform 204 may be implemented as a part of a cluster of servers. In some embodiments, security awareness and training platform 204 may be implemented across a plurality of servers, thereby, tasks performed by security awareness and training platform 204 may be performed by the plurality of servers. These tasks may be allocated among the cluster of servers by an application, a service, a daemon, a routine, or other executable logic for task allocation.

In one or more embodiments, security awareness and training platform 204 may facilitate cybersecurity awareness training, for example, via simulated phishing campaigns, computer-based trainings, remedial trainings, and risk score generation and tracking. A simulated phishing campaign is a technique of testing a user to determine whether the user is likely to recognize a true malicious phishing attack and act appropriately upon receiving the malicious phishing attack. In an implementation, security awareness and training platform 204 may execute the simulated phishing campaign by sending out one or more simulated phishing messages periodically or occasionally to the users and observe responses of the users to such simulated phishing messages. A simulated phishing message may mimic a real phishing message and appear genuine to entice a user to respond/interact with the simulated phishing message. Further, the simulated phishing message may include links, attachments, macros, or any other simulated phishing threat that resembles a real phishing threat. In an example, the simulated phishing message may be any message that is sent to a user with the intent of training him or her to recognize phishing attacks that would cause the user to reveal confidential information or otherwise compromise the security of the organization. In an example, a simulated phishing message may be an email, a Short Message Service (SMS) message, an Instant Messaging (IM) message, a voice message or any other electronic method of communication or messaging.

In response to a user interaction with the simulated phishing message, for example, if the user clicks on a link (i.e., a simulated phishing link), the user may be provided with security awareness training. If and how the user interacts with the simulated phishing message may be logged and may impact a risk score of the user, a team of which the user is part of, the organization, and an industry to which the organization belongs. In an implementation, security awareness and training platform 204 may be a Computer Based Security Awareness Training (CBSAT) system that performs security services such as performing simulated phishing campaigns on a user or a set of users of an organization as a part of security awareness training.

According to some embodiments, security awareness and training platform 204 may include processor 230 and memory 232. For example, processor 230 and memory 232 of security awareness and training platform 204 may be CPU 121 and main memory 122, respectively, as shown in FIGS. 1C and 1D. According to an embodiment, security awareness and training platform 204 may include generation unit 234 and processing unit 236. In an implementation, generation unit 234 and processing unit 236 may be communicatively coupled to processor 230 and memory 232. In some embodiments, generation unit 234 and processing unit 236, amongst other units, may include routines, programs, objects, components, data structures, etc., which may perform particular tasks or implement particular abstract data types. Generation unit 234 and processing unit 236 may also be implemented as signal processor(s), state machine(s), logic circuitries, and/or any other device or component that manipulate signals based on operational instructions.

In some embodiments, generation unit 234 and processing unit 236 may be implemented in hardware, instructions executed by the processing module, or by a combination thereof. The processing module may comprise a computer, a processor, a state machine, a logic array, or any other suitable devices capable of processing instructions. The processing module may be a general-purpose processor which executes instructions to cause the general-purpose processor to perform the required tasks or, the processing module may be dedicated to perform the required functions. In some embodiments, generation unit 234 and processing unit 236 may be machine-readable instructions which, when executed by a processor/processing module, perform any of desired functionalities. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, machine-readable instructions may be stored in memory 232.

Referring again to FIG. 2, in some embodiments, security awareness and training platform 204 may include keys storage 238, parameters storage 240, and user data storage 242. Keys storage 238 may include a plurality of unique keys for a plurality of email client plug-ins. In an example, keys storage 238 may include a unique key for email client 220 and/or for email client plug-in 222. In an example, the unique key may be unique to email client plug-in 222 among the plurality of email client plug-ins. The use of unique keys may depend on the circumstance. A unique key may be understood as a piece of information that defines a unique instance of email client plug-in 222 with threat reporting platform 206. In an example, the unique instance of email client plug-in 222 may be associated with an organization and the unique key therefore identifies with the specific email client plug-in 222 used by the organization. In an implementation, threat reporting platform 206 may enable individual users to report messages (or emails) that they find to be suspicious or believe to be malicious. In an example, threat reporting platform 206 may manage interactions with email client plug-in 222, which allows the reporting of suspicious messages directly from email client 220. According to an implementation, a unique key may be understood as a shared key that is not generally known, not shared in usual (such as general and day-to-day) operations, unique to the implementation of threat reporting platform 206 and email client plug-in 222, and unique to a deployment of threat reporting platform 206 and email client plug-in 222.

In some examples, a unique key may be understood as a piece of data allocated by security awareness and training platform 204 to email client plug-in 222 to indicate that email client plug-in 222 has been legitimately licensed to security awareness and training platform 204 and/or threat reporting platform 206. For instance, when the user installs email client 220, email client 220 or email client plug-in 222 may receive the unique key. The unique key of email client plug-in 222 may also be known to security awareness and training platform 204. Examples of the unique key include, but are not limited to, a software license key for email client plug-in 222, a customer identifier for email client plug-in 222, and a customer identifier for threat reporting platform 206.

In an implementation, parameters storage 240 may include information that is to be included into headers of simulated phishing messages. In an example, the information may include a list of codes for various cryptographic hashing functions. According to an implementation, user data storage 242 may include a list of intended recipients of simulated phishing messages generated as a part of a simulated phishing campaign. For example, user data storage 242 may include email address of intended recipients of the simulated phishing messages. Information related to unique keys stored in keys storage 238, information related to cryptographic hashing functions stored in parameters storage 240, and information related to intended recipients of the simulated phishing messages stored in user data storage 242 may be periodically or dynamically updated as required. In an implementation, keys storage 238, parameters storage 240, and user data storage 242 may include any type or form of storage, such as a database or a file system coupled to memory 232.

As a part of a cybersecurity awareness training or a simulated phishing campaign, security awareness and training platform 204 may be configured to prepare a simulated phishing message to be sent out to one or more users of the organizations including the user of client device 202. When security awareness and training platform 204 prepares the simulated phishing message for the one or more users, generation unit 234 may apply a cryptographic hashing function to the unique key of email client plug-in 222 to generate a hashed copy of the unique key. The hashed copy of the unique key may be referred to as a version of the unique key of email client plug-in 222, processed (or hashed) by a cryptographic hashing function. In an example, the cryptographic hashing function may refer to an algorithm that maps data of arbitrary size to an array of data of a fixed size. In an example, the cryptographic hashing function used by generation unit 234 may be 256-bit SHA-2 (SHA-256). In another example, other cryptographic hashing functions, for example, SHA-1, SHA-3 or RIPEMD-160, may be used. In an implementation, generation unit 234 may retrieve the unique key of email client plug-in 222 from keys storage 238.

According to an implementation, processing unit 236 may insert the hashed copy of the unique key in a predetermined field included in a header (or an email header) of the simulated phishing message. In an example, the predetermined field may be an enhanced extended header (X-header)

field which may be user-defined. An X-header may be understood as a custom proprietary email header that allows capabilities that are not offered with standard email headers. X-headers are called such because their name must begin with "X-" (for example, to delineate the X-header from standardized header fields). In an implementation, the predetermined field may be used for communicating certain information to email client plug-in 222. In an example, the predetermined field may also be known to as X-Phish-Parameters.

In an example implementation, the header of the simulated phishing message may also include different fields including, but not limited to, destination address fields and originator fields. In an example, the destination address fields may specify intended recipients of the simulated phishing message. Each destination address field may include one or more addresses, and the addresses may indicate the intended recipients of the message. In an example, the destination address fields may include "To:", "Cc:", and "Bcc:" address fields. Further, in an example, the originator fields may indicate mailbox(es) of source of the simulated phishing message. In an example, the originator fields may include "From:", "Sender:", and "Reply-To:" originator fields.

In some implementations, processing unit 236 may insert a code (or an identifier) along with the hashed copy of the unique key into the predetermined field of the header of the simulated phishing message. The code may be an identification of a type of the cryptographic hashing function used by generation unit 234 to generate the hashed copy of the unique key. In an implementation, processing unit 236 may insert the code and the hashed copy of the unique key in the predetermined field into the header of the simulated phishing message in accordance with a predefined format. In an example, the format may include one of a comma separated list of values and a space separated list of values.

A non-limiting example of a predetermined field in the header of the simulated phishing message is given below.

X-Phish-Parameters:
    2,cc91821b00cbf2c3426f2fe770b51b1dcfc6324a96
        b9f7859373b60c9ee4f 4d0

In the above example, the code representing the type of the cryptographic hashing function used and the hashed copy of the unique key are included in the predetermined field as comma separated list of values. Further, "2" may represent the cryptographic hashing function—256-bit SHA-2 (SHA-256) specification.

Another non-limiting example of a predetermined field in the header of the simulated phishing message is given below.

X-Phish-Parameters: function=S2
    hash=cc91821b00cbf2c3426f2fe770b51b1dc
        fc6324a96b9f7859373b60c9ee4f4d0

In the above example, the code representing the type of the cryptographic hashing function used and the hashed copy of the unique key are included in the predetermined field as space separated list of values with identifiers. Further, the value "function=S2" may represent the cryptographic hashing function—256-bit SHA-2 (SHA-256) specification.

According to one or more embodiments, to allow for secure identification of the intended recipient of a simulated phishing message, processing unit 236 may include a hashed version of a list of the one or more intended recipients of the simulated phishing message in the predetermined field of the header of the simulated phishing message. In an implementation, processing unit 236 may combine an email address of an intended recipient (for example, the user of client device 202) with the unique key of email client plug-in 222 in a predefined format prior to the application of the cryptographic hashing function. In an example, processing unit 236 may create a comma-separated list of values in a predefined format and order. For example, the email address of the intended recipient and the unique key of email client plug-in 222 may be combined as and in order "unique key-comma-<intended    recipient>@<organization domain>". Processing unit 236 may then apply the cryptographic hashing function to the complete list to values to create hashed information.

In some embodiments, processing unit 236 may also include a code along with the hashed information into the predetermined field. In an example, the code may be an identification of a format of the hashed information. A non-limiting example of a predetermined field including the hashed information and the code representing the format of the hashed information is given below.

X-Phish-Parameters: function=S2 fields=key,to value=
    6cdc1610f04777379edf8e70ef26275444da
        598d990bf06901bc5b166e37 23 ab In the above example, "function=S2" may represent the cryptographic hashing function 256-bit SHA-2 (SHA-256) specification and "fields=key,to" may represent that the specification of the hashed information is the unique key followed by the "To:" field in a comma-separated format.

According to some embodiments, processing unit 236 may combine the code representing the type of cryptographic hashing function and the code representing the hashed information into a single type description value.

A non-limiting example of a predetermined field including the code representing the type of cryptographic hashing function and the code representing the hashed information combined into the single type description value is given below.

X-Phish-Parameters:
    2KEYTO,6cdc1610f04777379edfe70ef26275444da5
        98d990bf06901b c5b166e3723ab In the above example, "2KEYTO" may represent that the cryptographic hashing function 256-bit SHA-2 (SHA-256) is used and the hashed information is the unique key followed by the "To:" field in a comma-separated format.

In some embodiments, processing unit 236 may include information from originator fields of the simulated phishing message header in the hashed information. In an implementation, processing unit 236 may include information included in the "Reply-To:" originator field as a list element in the hashed information. In an implementation, processing unit 236 may include the "Reply-To" originator field to the comma-separated list of values in a predefined manner. According to an embodiment, processing unit 236 may assign a new code to the combination of data, e.g., combination of the information included in the "Reply-To" originator field and the unique key is contained within hashed information. In an example, the hashed information may be represented by one or more hash values. As may be understood, the hash values are encrypted/encoded values that are encrypted using the cryptographic hashing function.

In an example, any information included within the header of the simulated phishing message may be referred to as header information. Other examples of combinations of header information and the unique key of email client plug-in 222 that are not discussed here are contemplated herein. In an example, these combinations may be predefined and may be assigned respective codes which may be known to both security awareness and training platform 204 and email client plug-in 222. In some implementations, processing unit 236 may separately process the unique key of email client plug-in 222 and the header information using the cryptographic hashing function. Accordingly, there may be two hash values for the hashed information in the predetermined field i.e., one for the unique key of email client plug-in 222 and other one for the header information. According to an implementation, email client plug-in 222 may be periodically updated to enable new codes to be defined which may not to be already known to email client plug-in 222.

According to one or more embodiments, as an alternative to the cryptographic hashing function, processing unit 236 may use a cryptography algorithm. In an example, the cryptography algorithm may be a protocol and mathematical algorithm that, when applied, may allow two systems to exchange information, such as an email, without a possibility of a third party interfering with the information. Examples of the cryptography algorithm include, but are not limited to, a symmetric key cryptography algorithm and a public key cryptography algorithm. In an example, a cryptography algorithm may require sharing of one or more cryptographic keys to enable the cryptography algorithm. In an example, a cryptographic key may be a secret key that may be used to encrypt plaintext and decrypt ciphertext. In an example, the same cryptographic key may be used for both encryption and decryption operations. In some examples, a different or mathematically-related key may be used for both encryption and decryption operations.

In an implementation, while using the cryptography algorithm, processing unit 236 may share a cryptographic key with email client plug-in 222 for the purpose of decrypting information in the header of the simulated phishing message. In an implementation, during the generation of the simulated phishing message, the information or fields which are to be transferred securely within the header of the simulated phishing message are formatted using a comma-separated list. A non-limiting example of a "plaintext" list that may be included in the simulated phishing message is given below.

fields=key,to value=1234abcd,demo_user@demo.org

In an implementation, processing unit 236 may encrypt the "plaintext" list using the cryptography algorithm and the cryptographic key. As a result of encryption, a "ciphertext" list is generated. Subsequently, processing unit 236 may include the "ciphertext" list in the predetermined field of the header of the simulated phishing message. A non-limiting example of "ciphertext" list is given below.

X-Phish-Parameters:
WRzJnlMOD6i4mkglkJOEfqM28IBoyw6GL1Q19K8T

In an implementation, processing unit 236 may transmit the simulated phishing message to the user of client device 202 via network 210. The transmission of the simulated phishing message from security awareness and training platform 204 to client device 202 may be performed in several ways which are well known in the art and need not be explained here. In an example, processing unit 236 may transmit the simulated phishing message via a Simple Message Transfer Protocol (SMTP) protocol.

According to one or more embodiments, processing unit 236 may also provide the unique key of email client plug-in 222 and/or the cryptographic key to email client plug-in 222. In an example, processing unit 236 may provide the unique key during the initialization of email client plug-in 222 or at other times. For example, email client plug-in 222 may provide the unique key to email client plug-in 222 upon initialization of email client plug-in 222 by email client 220, for example, either on its first deployment or with every initialization. For instance, when email client plug-in 222 is initialized by email client 220, a transaction with threat reporting platform 206 may be carried out. According to an example, during the transaction, processing unit 236 may provide or share the unique key with email client plug-in 222. For instance, the transaction may ensure that both email client plug-in 222 and threat reporting platform 206 may share a common identifier. In an example, the transaction may occur only when email client plug-in 222 is first deployed, first initialized, or re-initialized as if it was first deployed (for example, in a re-installation situation). In some examples, the transaction may occur more frequently, such as each time email client plug-in 222 is initialized for use or on a periodic basis, for example, at 2:00 AM every day.

Further, processing unit 236 may provide email client plug-in 222 with one or more of the following: a list of one or more cryptographic hashing functions for encoding the one or more hash values, identification of the predetermined field, and identification of information to be mapped into the one or more hash values. In an example, processing unit 236 may share a code representing the type of cryptographic hashing function used and other such codes with email client plug-in 222. Accordingly, the code is known at both security awareness and training platform 204 and email client plug-in 222.

According to one or more embodiments, the user of client device 202 may receive an email in his or her mailbox. For instance, the email is downloaded to the user's mailbox when the user is online (i.e., when email client 220 is connected to network 210). In an example, the email may be a simulated phishing message communicated to the user by security awareness and training platform 204. In some example embodiments, system 200 operates even when email client 220 is no longer online, i.e., not connected to network 210.

The simulated phishing message may include the unique key of email client plug-in 222 mapped by a cryptographic hashing function into a hash value in a predetermined field in a header of the simulated phishing message. In an example implementation, on receiving an email in his or her mailbox, if the user suspects that the email is potentially malicious, the user may report the email using email client plug-in 222. In an implementation, email client plug-in 222 may provide a UI element such as a button in email client 220 of client device 202. In an example, when the user receives an email and the user suspects that the email is potentially malicious, then the user may click on the UI element to report the email using, for example, a mouse pointer. For instance, the user may click on the UI element when the email is open or when the email is highlighted in a list of inbox emails.

In some implementations, when the user selects to report the email via the UI element, email client plug-in 222 may receive an indication that the email was reported by the user of client device 202 as a suspicious message. According to an implementation, determination unit 224 may detect a presence of the predetermined field in the header of the simulated phishing message. In an implementation, determination unit 224 may analyze the header of the simulated phishing message to determine whether the predetermined field is present. In an example, the predetermined field in the header of the simulated phishing message may include an identification of a type of the cryptographic hashing function used by security awareness and training platform 204 to create the hash value in the predetermined field. Also, the predetermined field may include an identification of a format of information. In an example, the format of the information may include a comma separated list of values. In some examples, the information may include a list of one or more intended recipients of the simulated phishing message. In an example, the format may include an order of values to identify the order of the unique key of email client plug-in 222 and the information.

In an implementation, analyzing unit 226 may identify the type of cryptographic hashing function used by security awareness and training platform 204 in the predetermined field. Analyzing unit 226 may also identify the format of the information in the predetermined field. According to an implementation, analyzing unit 226 may be configured to parse the data included in the predetermined field and identify the format of the information which has been hashed. In an example, there may be no data to identify a single hash value present in the predetermined field and this situation may be equated to the hash value being solely of a unique key of email client plug-in 222. In some examples, there may be two hash values present which may be determined by a code list (shared by security awareness and training platform 204) to represent a code value that represents both the format of the information and the cryptographic hashing function.

In response to determining the format of the information and the cryptographic hashing function, analyzing unit 226 may create the same format using the information that may be available or known to analyzing unit 226. In an implementation, analyzing unit 226 may create the format using values of "From:", "Sender:", "Reply-To:" originator fields, the "To:", "Cc:", "Bcc:" destination address fields, and any other fields are may be present in the header of the simulated phishing message and based on the unique key of email client plug-in 222. According to an implementation, analyzing unit 226 may apply the cryptographic hashing function to the unique key received by email client plug-in 222 from security awareness and training platform 204 and the information in accordance with the format to determine a local version of the hashed information. As described before, email client plug-in 222 may receive the unique key upon initialization by email client 220, for example, either on its first deployment or with every initialization. Accordingly, the unique key may be known beforehand to email client plug-in 222.

According to an implementation, analyzing unit 226 may compare the hash value in the predetermined field to a result of applying the cryptographic hashing function to the described combination of unique key received by email client plug-in 222 and other information from the header. In an example, the result may refer to the local version of the hashed information. In response to determining that the hash value in the predetermined field matches with the result, analyzing unit 226 may determine that the suspicious message is a simulated phishing message generated by security awareness and training platform 204. According to an example, if the two values (i.e., the hash value in the predetermined field and the local version of the hashed information) are identical, then analyzing unit 226 may determine that any fields in the header that have been encoded correspond to the fields in the header that are included in the suspicious message, that the suspicious message was generated by security awareness and training platform 204 implemented by the organization and that the suspicious message is a simulated phishing message and not a generic instance or copied (spoofed) instance of the email. Also, analyzing unit 226 may be configured to generate statistics, reports, or other actions based on the validity of the header of the suspicious message. In an implementation, when the predetermined field includes two or more hash values of the hashed information, then analyzing unit 226 may generate two or more different values of hashed information and compare the values independently. Accordingly, analyzing unit 226 may determine the validity of the unique key of email client plug-in 222 and the other header information separately. Benefits of the previously described method include the ability of analyzing unit 226 to determine that while the message was generated by security awareness and training platform 204, at some point in the process of generation and addition of the hashed information and the processing of the message by email client plug-in 222, that the email headers contained with the hashed information were changed.

In an embodiment, when the cryptography algorithm is applied instead of the cryptographic hashing function, determination unit 224 may decrypt ciphertext included in the predetermined field using a complementary cryptography algorithm and cryptographic key to retrieve the plaintext information. In an implementation, analyzing unit 226 may compare the values included in the plaintext version of the predetermined field with the values in the header and determine if they have been modified. According to an embodiment, analyzing unit 226 may compare the unique key of email client plug-in 222 included in the predetermined field in the header of the email with the unique key of email client plug-in 222 shared earlier to determine whether the email is a simulated phishing message. In some embodiments, the successful decryption of the ciphertext using the cryptographic key may indicate that the email is a simulated phishing message generated by security awareness and training platform 204. According to various aspects of the present disclosure, email client plug-in 222 is enabled to determine whether the email reported by the user has been generated by security awareness and training platform 204.

FIG. 3 depicts flowchart 300 for communicating a simulated phishing message having a unique key of email client plug-in 222 to a user, according to some embodiments.

Step 302 includes generating a hashed copy of a unique key of email client plug-in 222 based on applying a cryptographic hashing function to the unique key of email client plug-in 222. According to an implementation, generation unit 234 of security awareness and training platform 204 may generate the hashed copy of the unique key of email client plug-in 222 based on applying a cryptographic hashing function to the unique key of email client plug-in 222. In an implementation, generation unit 234 may retrieve the unique key of email client plug-in 222 from keys storage 238 and a type of cryptographic hashing function that is applied from parameters storage 240.

Step 304 includes inserting the hashed copy of the unique key and a code representing a type of the cryptographic hashing function used in a predetermined field included in a header of a simulated phishing message. According to an implementation, processing unit 236 of security awareness and training platform 204 may insert the hashed copy of the unique key and a code representing a type of the cryptographic hashing function used in the predetermined field in the header of the simulated phishing message. In an implementation, processing unit 236 may retrieve the code for the cryptographic hashing function from parameters storage 240.

Step 306 includes transmitting the simulated phishing message including the hashed copy of the unique key and the code to a user. In an example, the user may be user of client device 202. According to an implementation, processing unit 236 may transmit the simulated phishing message including the hashed copy of the unique key and the code to the user.

FIG. 4 depicts flowchart 400 for detecting a simulated phishing message by an email client plug-in, according to some embodiments.

Step 402 includes receiving a unique key for email client plug-in. In an implementation, email client plug-in 222 may receive the unique key from security awareness and training platform 204 upon initialization of the email client plug-in 222. In an example, the unique key may be unique to email client plug-in 222 among a plurality of email client plug-ins.

Step 404 includes receiving an indication that an email was reported by a user as a suspicious message. In an example, the email is a simulated phishing message having the unique key mapped by a predetermined cryptographic hashing function into a hash value in a predetermined field in a header of the simulated phishing message. According to an implementation, email client plug-in 222 may receive the indication that the email was reported by the user as the suspicious message.

Step 406 includes detecting the presence of the predetermined field in the header of the simulated phishing message. According to an implementation, email client plug-in 222 may detect the presence of the predetermined field in the header of the simulated phishing message.

Step 408 includes comparing the hash value in the predetermined field to a result of applying the predetermined cryptographic hashing function to the unique key. According to an implementation, email client plug-in 222 may apply the predetermined cryptographic hashing function to the unique key received by email client plug-in 222 and compare the hash value in the predetermined field to a result of applying the cryptographic hashing function to the unique key.

Step 410 includes, responsive to the hash value in the predetermined field being matched to the result, determining that the suspicious message is a simulated phishing message. According to an implementation, responsive to the hash value in the predetermined field being matched to the result, email client plug-in 222 may determine that the suspicious message is a simulated phishing message.

FIG. 5 depicts flowchart 500 for detecting a simulated phishing message by an email client plug-in, according to some embodiments.

Step 502 includes receiving a unique key for email client plug-in 222. In an implementation, email client plug-in 222 may receive the unique key from security awareness and training platform 204 upon initialization of the email client plug-in 222. In an example, the unique key may be unique to email client plug-in 222 among a plurality of email client plug-ins.

Step 504 includes receiving an indication that an email was reported by a user as a suspicious message. In an example, the email is a simulated phishing message having a predetermined field in a header containing identification of a format of information and a hash value derived by a cryptographic hashing function from the unique key and information associated with recipients of the simulated phishing message. In an example, the information includes a list of one or more intended recipients of the simulated phishing message. For example, the information may include email addresses of the recipients of the simulated phishing message. According to an implementation, email client plug-in 222 may receive the indication that the email was reported by the user as the suspicious message.

Step 506 includes detecting the presence of the predetermined field in the header of the simulated phishing message and further detecting in the predetermined field identification of the format of information. According to an implementation, email client plug-in 222 may detect the presence of the predetermined field in the header of the simulated phishing message and further detect in the predetermined field identification of the format of information to which to apply a cryptographic hashing function. In an example, the format may include a comma separated list of values. Also, the format may include an order of values to identify the order of the unique key of email client plug-in 222 and the information.

Step 508 includes comparing a hash value in the predetermined field to a result of applying the cryptographic hashing function to the unique key received by email client plug-in 222 and the recipients of the email formatted according to identification of the format of information in the predetermined field. According to an implementation, email client plug-in 222 may compare the hash value in the predetermined field to the result of applying the cryptographic hashing function to the unique key received by email client plug-in 222 and the recipients of the email formatted according to the identification of the format of information in the predetermined field Step 510 includes responsive to the hash value in the predetermined field being matched to the result, determining that the suspicious message is a simulated phishing message. According to an implementation, responsive to the hash value in the predetermined field being matched to the result, email client plug-in 222 may determine that the suspicious message is a simulated phishing message. In examples, statistics, reports, or other actions may be generated based on the validity of the header of the suspicious message.

The systems and methods of the present disclosure provide scalability with the number of email clients that are supported as there is no dependency on bandwidth at threat reporting platform 206. Also, the systems and methods of the present disclosure provide scalability in terms of elements that can be checked by email client plug-in 222 such as license key, recipient details, subject, time sent, and the like, as there is no dependency on bandwidth of a threat detection platform. The threat detection platform is a platform for monitoring, identifying, and managing security threats while collecting and analyzing data to prevent further threats. Further benefits of the systems and methods previously described include providing scalability in terms of the number of email clients 220 that are supported. Further benefits of the systems and methods previously described include enabling processing over a network connection that may not be reliable or secure. Further benefits of the systems and methods previously described include allowing for hashing or encryption of the data contained in the predetermined field to protect the content from analysis, modification, and spoofing.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for detecting a simulated phishing message by an email client plug-in, the method comprising:

receiving, by an email client plug-in configured on one or more processors, coupled to memory, on a client device, a unique key from a server, the unique key assigned to the email client plug-in;

receiving, by the email client plug-in, an indication that an email was reported by a user as a suspicious message, the email communicated by the server as a simulated phishing email having the unique key of that email client plug-in mapped by a cryptographic hashing function into a hash value in a predetermined field in a header of the simulated phishing email;

detecting, by the email client plug-in, presence of the predetermined field in the header of the simulated phishing email, the predetermined field comprising identification of a format to format information to which to apply the cryptographic hashing function by the email client plug-in, the information comprising a list of one of more intended recipients of the simulated phishing email, wherein the format identifies an order and a separator character for which to format the unique key and the list of one or more intended recipients of the simulated phishing email;

combining, by the email client plug-in using the format identified by the predetermined field, the unique key received by the email client plug-in with the list of one or more intended recipients of the simulated phishing email into formatted information using the separator character in the order specified by the format to create a formatted information;

comparing, by the email client plug-in, the hash value in the predetermined field to a local hash value resulting from applying by the email client plug-in the cryptographic hashing function to the formatted information comprising the unique key received by the email client plug-in combined with the list of one or more intended recipients of the simulated phishing using the separator character in the order specified by the format; and determining, by the email client plug-in responsive to the hash value in the predetermined field being matched to the result, that the suspicious message is a simulated phishing message generated by the server.

2. The method of claim 1, further comprising receiving, by the email client plug-in, the unique key upon initialization of the email client plug-in, wherein the unique key is unique to the email client plug-in among a plurality of email client plug-ins.

3. The method of claim 1, further comprising receiving, by the email client plug-in, from the server one or more of the following: a list of one or more cryptographic hashing functions for encoding the hash value, identification of the predetermined field, and identification of information to be mapped into the hash value.

4. The method of claim 1, wherein the predetermined field in the header of the simulated phishing email comprises identification of a type of the cryptographic hashing function used by the server to create the hash value in the predetermined field.

5. The method of claim 4, further comprising identifying, by the email client plug-in, the type of cryptographic hashing function used by the server in the predetermined field and applying the type of cryptographic hashing function to the unique key combined with the list of one or more intended recipients of the simulated phishing in the order specified by the format.

6. The method of claim 1, further comprising identifying, by the email client plug-in, the format of the information identified by the predetermined field and applying the cryptographic hashing function to the unique key combined with the list of one or more intended recipients of the simulated phishing in the order specified by the format.

7. The method of claim 1, wherein the format comprises a comma separated list of values.

8. The method of claim 1, wherein the format comprises an order of values to identify the order of the unique key of the email client plug-in and the information.

9. A system for detecting a simulated phishing message by an email client plug-in, the system comprising:

an email client plug-in configured on one or more processors, coupled to memory, of a client device and configured to:

receive a unique key from a server, the unique key assigned to the email client plug-in;

receive an indication that an email was reported by a user as a suspicious message, the email communicated by the server as a simulated phishing email having the unique key of that email client plug-in mapped by a cryptographic hashing function into a hash value in a predetermined field in a header of the simulated phishing email;

detect presence of the predetermined field in the header of the simulated phishing email, wherein the predetermined field comprising identification of a format to format information to which to apply the cryptographic hashing function by the email client plug-in, wherein the information comprises a list of one of more intended recipients of the simulated phishing email, wherein the format identifies an order and a separator character for which to format the unique key and the list of one of more intended recipients of the simulated phishing email;

combine, using the format identified by the predetermined field, the unique key received by the email client plug-in with the list of one or more intended recipients of the simulated phishing email into formatted information using the separator character in the order specified by the format to create a formatted information;

compare the hash value in the predetermined field to local hash value resulting from applying by the email client plug-in the cryptographic hashing function to the formatted information comprising the unique key received by the email client plug-in combined with the list of one or more intended recipients of the simulated phishing using the separator character in the order specified by the format; and determine, responsive to the hash value in the predetermined field being matched to the result, that the suspicious message is a simulated phishing message generated by the server.

10. The system of claim 9, wherein the email client plug-in is further configured to receive the unique key upon initialization of the email client plug-in, and wherein the unique key is unique to the email client plug-in among a plurality of email client plug-ins.

11. The system of claim 9, wherein the email client plug-in is further configured to receive from the server one or more of the following: a list of one or more cryptographic hashing functions for encoding the hash value, identification of the predetermined field, and identification of information to be mapped into the hash value.

12. The system of claim 9, wherein the predetermined field in the header of the simulated phishing email comprises identification of a type of the cryptographic hashing function used by the server to create the hash value in the predetermined field.

13. The system of claim 12, wherein the email client plug-in is further configured to identify the type of cryptographic hashing function used by the server in the predetermined field and apply the type of cryptographic hashing function to the unique key combined with the list of one or more intended recipients of the simulated phishing in the order specified by the format.

14. The system of claim 9, wherein the email client plug-in is further configured to identify the format of the information identified by the predetermined field and apply the cryptographic hashing function to the unique key combined with the list of one or more intended recipients of the simulated phishing in the order specified by the format.

15. The system of claim 9, wherein the format comprises a comma separated list of values.

16. The system of claim 9, wherein the format comprises an order of values to identify the order of the unique key of the email client plug-in and the information.

\* \* \* \* \*